United States Patent [19]
Berends

[11] 3,717,363
[45] Feb. 20, 1973

[54] CONVERTIBLE DOLLY-TANDEM AXLE

[75] Inventor: Howard Berends, Fruitport, Mich.

[73] Assignee: Holland Hitch Company, Holland, Mich.

[22] Filed: Sept. 28, 1971

[21] Appl. No.: 184,519

[52] U.S. Cl...............280/476, 280/418, 280/423 A, 280/425 R, 280/482
[51] Int. Cl. ............................................B62d 53/02
[58] Field of Search ......280/476, 418, 423 A, 425 R, 280/482, 415 B, 504

[56] References Cited

UNITED STATES PATENTS

| | | | |
|---|---|---|---|
| 2,733,931 | 2/1956 | Reid et al. | 280/425 R |
| 2,847,233 | 8/1958 | Minton | 280/504 |
| 3,136,394 | 6/1964 | Woolslayer et al. | 280/423 A X |
| 3,139,289 | 6/1964 | Richler | 280/425 R |
| 3,312,479 | 4/1967 | Cunha | 280/415 B |
| 3,413,015 | 11/1968 | Fontaine | 280/415 B |
| 3,479,055 | 11/1969 | Cunha et al. | 280/415 B |
| 3,484,852 | 12/1969 | Norrie et al. | 280/476 |

Primary Examiner—Leo Friaglia
Attorney—Price, Heneveld, Huizenga & Cooper

[57] ABSTRACT

A single axle two-wheeled dolly assembly including a fifth wheel which can be raised or lowered and a tongue telescopically mounted in a forward extending sleeve. The dolly can be employed as a tandem axle on a tractor by lowering the fifth wheel thereon, retracting the tongue into the sleeve; and fitting the tongue sleeve into a corresponding sleeve in the rear of a tractor. The dolly is securely locked to the tractor by means of a coupling and locking collar holding the tractor and dolly together thereby forming a tandem axle tractor. For use as a dolly to pull a second trailer, a lunette on the front of the tongue is rotated 90° thereby unlocking the telescopically retracted tongue, the lunette and tongue are pulled forward to extend the tongue, and the lunette is rotated 90° to lock the tongue in its extended position whereby the lunette can be coupled to the rear of a first trailer. The fifth wheel is then raised by means of a threaded shaft arrangement such that it can receive the the king pin of a second trailer.

22 Claims, 14 Drawing Figures

CONVERTIBLE DOLLY-TANDEM AXLE

BACKGROUND OF THE INVENTION

The present invention relates to a convertible dolly for semi-trailer hauling and more particularly to a dolly useable alternately as a tandem axle for a truck tractor, or a dolly to haul a second trailer.

Dollies of several known types for hauling additional trailers with a semi-truck are currently in use but are not convertible, as is the present dolly, for use both as a second trailer hauling attachment for a vehicle as well as a tandem axle structure for the tractor. A convertible dolly described in a U.S. Pat. application entitled TRUCK TRACTOR CONVERTER DOLLY filed on Dec. 7, 1970, Ser. No. 95,457 and assigned to the present assignee, is a novel dolly assembly which is convertible but which employs a relatively complex lifting arrangement for raising and lowering the associated fifth wheel as well as a coupling and locking mechanism which is subject to wear during use. Thus, existing dollies are either not convertible for alternate use or if convertible, are relatively complex and therefore relatively expensive in addition to being subject to excessive wear.

SUMMARY OF THE INVENTION

The dolly of the present invention, however, provides an improved coupling arrangement for coupling and locking the dolly to the tractor in tandem axle relationship. Such coupling is designed to be very durable during use and not subject to excessive wear. Additionally, the telescopic tongue of the present dolly works in conjunction with the fifth wheel mechanism to prevent the raising of the fifth wheel when used as a tandem axle and to require the lowering of the fifth wheel before the tongue is in its retracted position. The fifth wheel is self-locking in the raised position and does not require complex and therefore costly locking mechanism.

It is an object of the present invention, therefore, to provide an improved convertible dolly for use as a tandem axle with a tractor or as a dolly for hauling an additional trailer.

A further object of the present invention is to provide a coupling and locking collar for coupling the dolly to the tractor, the collar being a quarter turn quick disconnect type including a locking pin for holding the collar in the locked position.

An additional object of the present invention is to provide a mechanism for raising and lowering a fifth wheel mounted to the dolly which operates in conjunction with the telescopic tongue of the dolly such that the fifth wheel can be raised only when the tongue is in its forward position for use as a trailer hauling dolly.

Dollies embodying the present invention comprise an axle having a pair of wheels mounted thereon, a framework mounted to the axle with a fifth wheel assembly mounted to the framework by means of a lift arm assembly. A sleeve is mounted centrally to the framework and includes a telescopically and concentrically mounted tongue having a lunette at one end. A crank arm is provided with a threaded member coupled to a slidably mounted collar at the rear of the sleeve. The slidable collar is movable when the crank arm is rotated such that when the collar, which is further coupled to the lift arm assembly for the fifth wheel, is rotated, the fifth wheel is raised or lowered. Mounted external to the sleeve and forward of the framework is a coupling and locking collar coupled to the dolly by means of interlocking segments on the collar and on the tongue sleeve. The locking collar is adapted to couple to associated locking segments on the tractor when the protruding forward portion of the tongue sleeve is fitted into a corresponding receiving sleeve in the tractor. The coupling sleeve is a quick disconnect type which can be coupled or disconnected by means of a quarter turn rotation.

DETAILED DESCRIPTION OF THE PREFERRED EMBODIMENT

Figure 1:
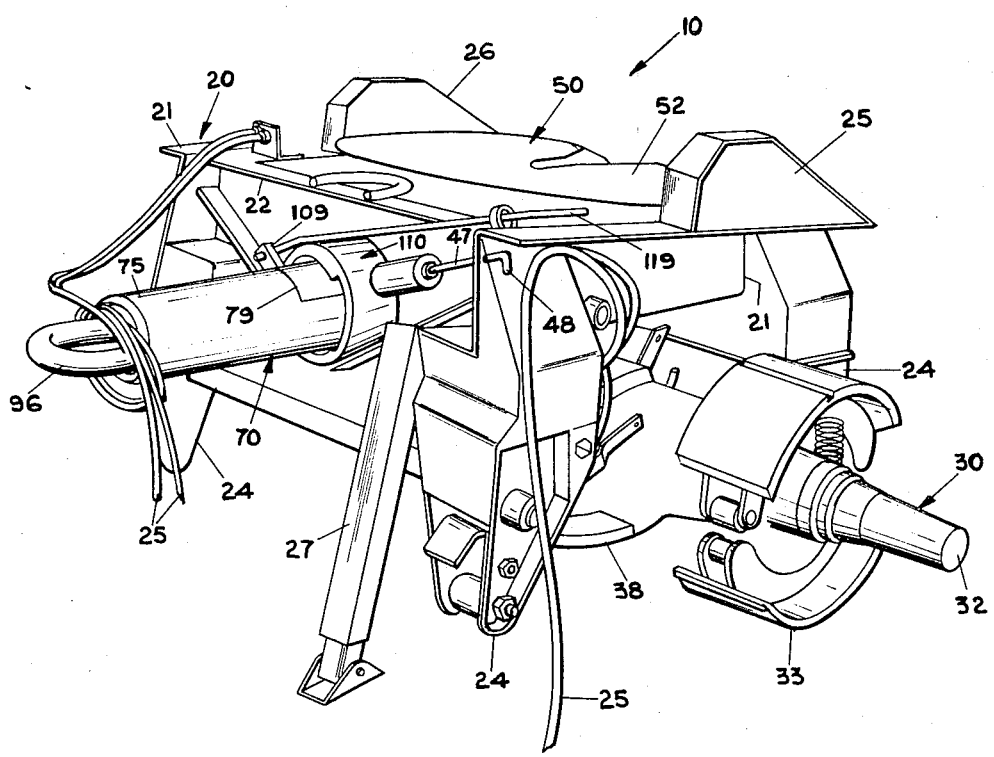
FIG. 1 is a perspective view of the dolly assembly with the telescopically mounted tongue in its retracted position and the fifth wheel lowered. The wheels of the dolly are removed so that the framework can be more clearly seen.
Figure 2:
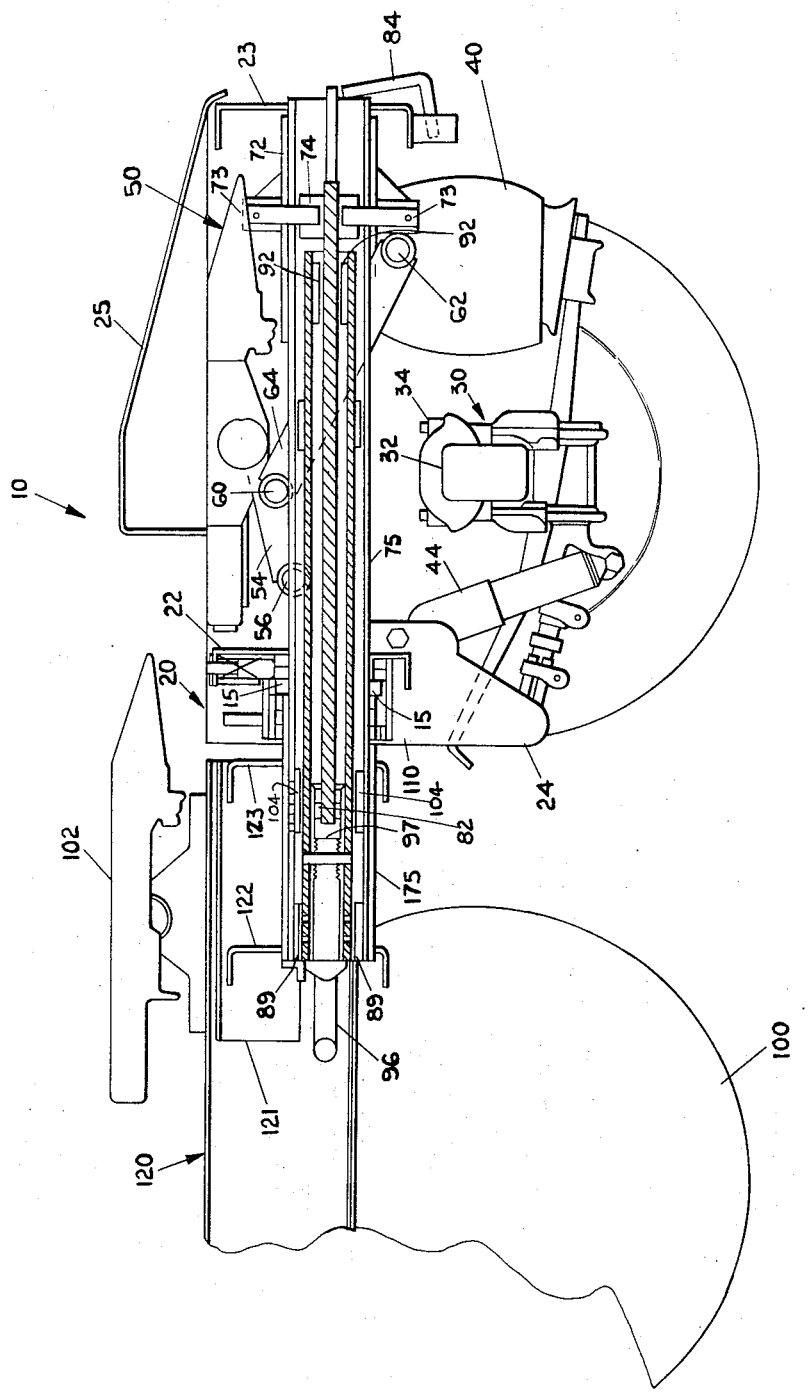
FIG. 2 is a cross-sectional view of the dolly assembly coupled to a tractor for use as a tandem axle.
Figure 4:
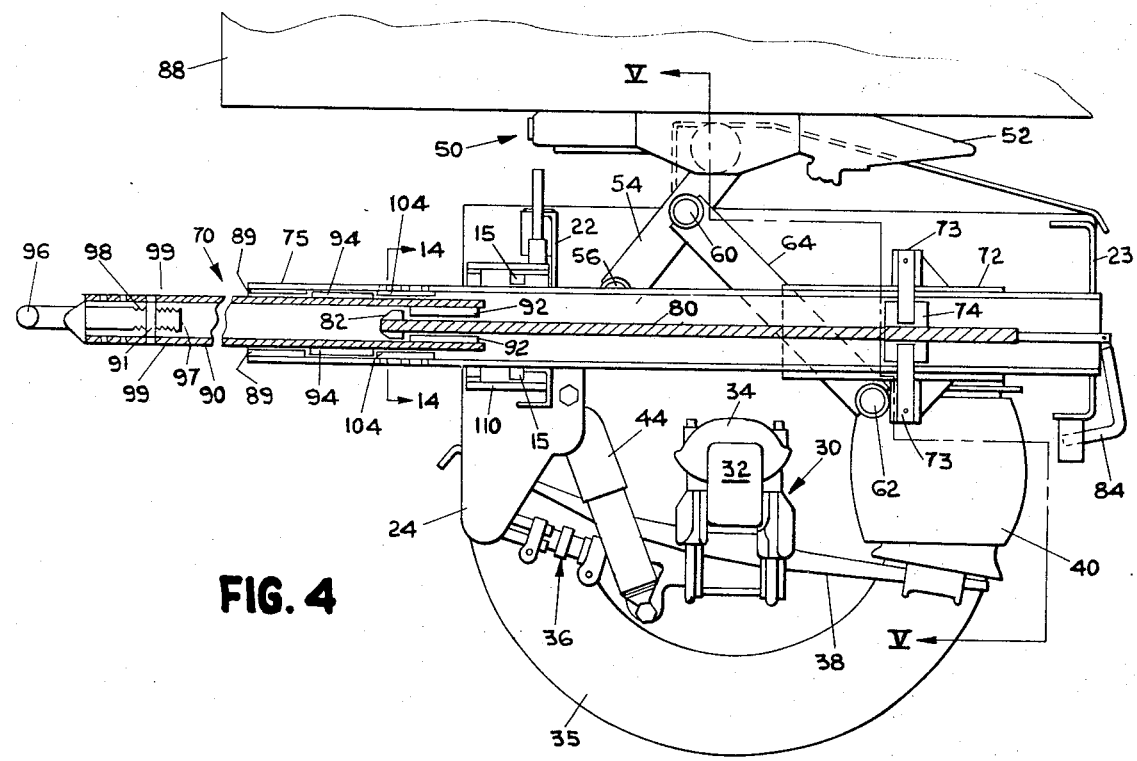
FIG. 4 is a cross-sectional view showing the dolly for use in hauling an additional trailer, the tongue being extended and the fifth wheel raised to receive the king pin of the additional trailer.
Figure 3:
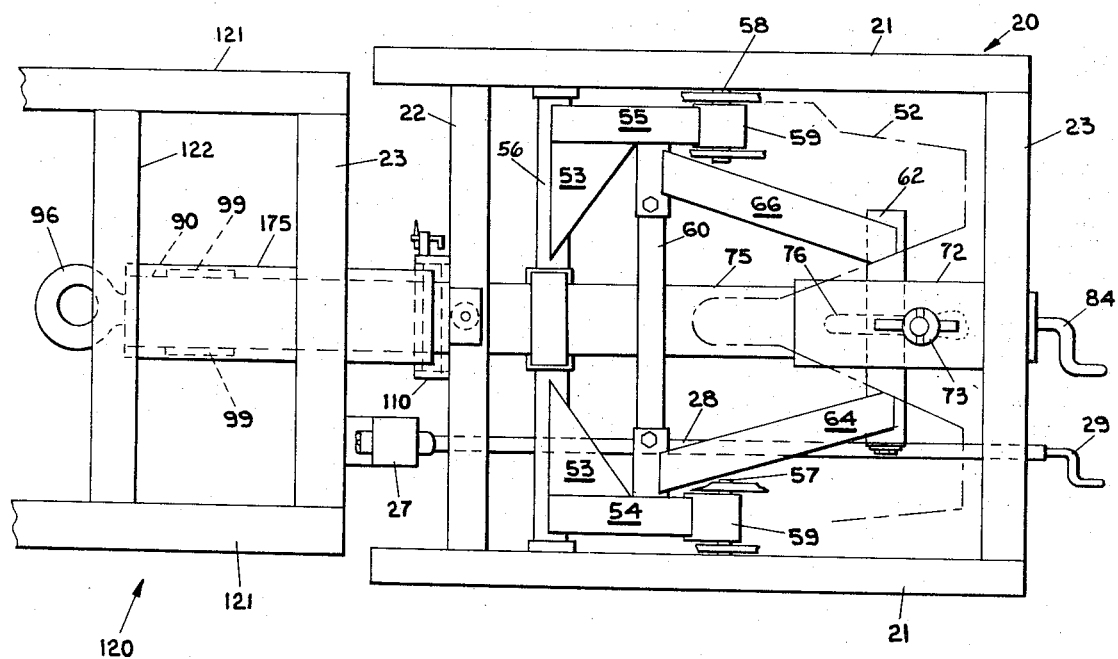
FIG. 3 is a top view of the dolly in tandem axle coupling to the tractor with the fifth wheel shown in phantom form so that the lift arms can be clearly seen.
Figure 5:
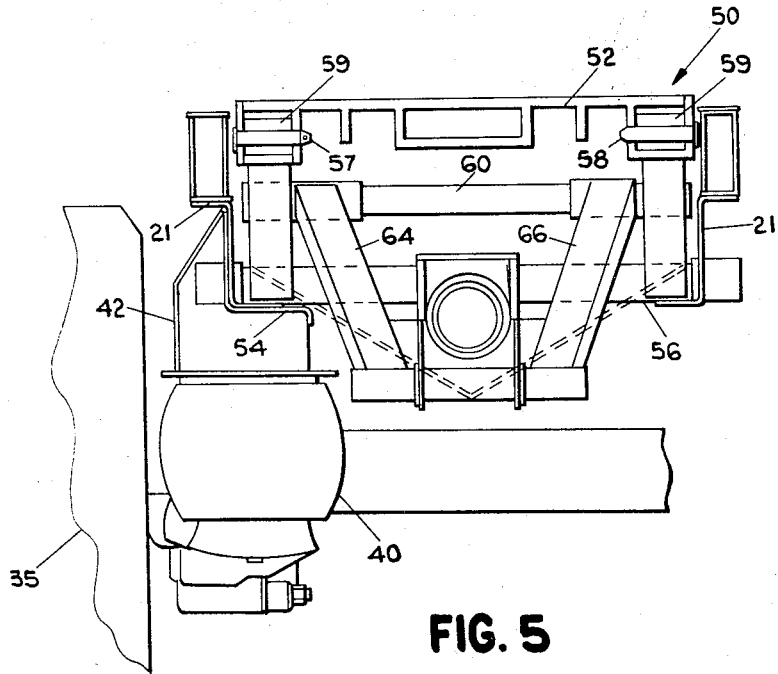
FIG. 5 is a partial sectional rear view taken along the section lines V-V in FIG. 4 and showing the lifting arm assembly for the fifth wheel in detail.

Referring now to the drawings and specifically to FIGS. 1 through 5, it is seen that the dolly 10 can be employed as a tandem axle as shown in FIGS. 2 and 3 with a tractor, or as shown in FIGS. 4 and 5, can be employed with a trailer for hauling an additional trailer with the tractor.

The dolly 10 includes a frame subassembly 20, a wheeled axle subassembly 30, a fifth wheel assembly 50 and an extensible and retractable tongue assembly 70.

The frame subassembly 20 includes a pair of fore and aft extending Z-shaped frame members 21 coupled together at the forward edge by front cross-tie 22 and at the rear edge by rear cross-tie 23. The front corners of the frame have downwardly depending support members 24 which are welded or otherwise securely affixed to the rectangular frame. The support members 24 serve to couple the wheeled axle subassembly 30 to the frame subassembly 20. The wheeled axle subassembly 30 serves to support the frame assembly and associated subassemblies by means of a transverse axle 32 preferably of rectangular configuration and axle mounting brackets 34. The brackets are connected to a pair of stabilizing pivot rods 36 (FIG. 4) coupled from the axle to the forward support members 24 of the frame assembly 20. The axle is also secured to the central portion of a pair of laterally spaced leaf springs 38 (FIGS. 1 and 4) attached at their forward ends to the forward support members 24 and at their rearward ends to the bottom of a pair of air springs 40 (FIGS. 4 and 5). The upper ends of the inflatable air springs 40 are coupled to the rear of the framework 20 by means of mounting brackets 42 (FIG. 5) which underlie the side members 21 of the frame. Conventional shock absorbers 44 are also mounted between the axle brackets 36 and the framework at the forward support members 24. As shown in FIG. 1, the ends of the axle 32 include a pair of brake shoes 33 over which are mounted wheels 35 as shown in FIGS. 4 and 5.

Mounted to the framework 20 in a unique manner is the fifth wheel subassembly 50. This subassembly includes a conventional fifth wheel 52 having a bifurcated tapered rear portion to receive a conventional king pin on a trailer. The fifth wheel uses any suitable lock-jaw arrangement as shown, for example, in U.S. Pat. No. 2,982,566, entitled FIFTH WHEEL issued to H. A. Geerds on May 2, 1961. This fifth wheel is mounted and supported such that it can be raised as shown in FIGS. 4 and 5 or lowered as shown in FIGS. 1, 2 and 3 by means of a pair of forward lift arms 54 and 55 pivotally coupled to the frame assembly at one end thereof by means of a pair of shafts 56 and pivotally mounted to the fifth wheel by means of pins 57 and 58 mounted into the fifth wheel by means of a bearing assembly 59 associated with each of the pins. The forward lift arms 54 and 55 are securely braced to resist side thrust by means of triangular reinforcement sections 53 shown in FIG. 3.

Coupled between the lift arms 54 and 55 is a cross-shaft 60. Rear lift arms 64 and 66 are rotatably mounted to shaft 60. The opposite ends of the rear lift arms 64 and 66 are rotatably coupled to a rear cross-shaft 62. The fifth wheel is raised and lowered by means of moving the rear cross-shaft 62 forwardly to raise the fifth wheel or backwardly to lower the fifth wheel by means of a collar 72 slidably mounted to a tongue sleeve 75 which is welded to the central portion of the frame assembly 20 and extends forwardly thereof.

As seen in FIGS. 2, 3 and 4, collar 72 is a cylindrical member having an inner diameter greater than the outer diameter of the cylindrical tongue sleeve member 75. The sleeve 75 includes a pair of elongated apertures 76 in the opposing sides of the sleeve as shown in FIG. 3. A pair of pins 73 fit through the apertures 76 and couple the collar 72 to a threaded nut 74 within the sleeve 75. A threaded shaft 80 extends concentrically through the sleeve 75 and has one end supported by means of a locking bushing 82 which loosely fits within the tongue shaft 90 of the tongue assembly 70, the tongue shaft 90 being fitted within the tongue sleeve 75. The opposite end of the threaded shaft 80 includes a crank handle 84 which is pivotally mounted to the shaft 80 such that it can be raised into a cranking position or lowered as shown in FIG. 4 for storage. With the tongue in its forward position as shown in FIG. 4, the locking bushing 82 comes into contact with a cylindrical block 92 mounted on the internal surface of the right rear end of the cylindrical tongue shaft 90 as shown in FIG. 4. The fifth wheel is raised and lowered in the following manner.

First, to raise the fifth wheel, the crank handle 84 is rotated in a counter-clockwise direction. As the shaft 80 is rotated in a counter-clockwise direction, it will tend to move to the right due to contact with the threaded nut 74. The block 92, however, welded to the tongue shaft 90 which in turn is locked into place in its extended position as explained below, will prevent the shaft 80 from moving to the right. Shaft 80 will therefore apply a forward force on the collar 72 through the threaded nut 74 and locking pins 73. The rear lift arms 64 and 66 will thereby be pushed forwardly by the rear cross shaft 62 which passes through the collar 72. The fifth wheel 52 will be raised as the forward lift arms 54 and 55 pivot forwardly and upwardly about shaft 56. It is seen that the fifth wheel can be raised only when the tongue 90 is in its extended position such that the locking bushing 82 will encounter a reactive force against the block 92 welded inside the tongue shaft.

To lower the fifth wheel, the tongue shaft 90 is returned, as explained below, to its retracted position and as the crank handle 84 is rotated in a clockwise direction, the shaft tends to move to the left. However, the weight of the fifth wheel 52 forces arm 54 and 55 downward rotationally about shaft 56 moving against arms 64 and 66 which exert pressure on slidable collar 72 to the left which in turn will force the threaded nut 74 rearwardly to lower the fifth wheel in a reverse manner to the raising motion of the fifth wheel. Thus, by virtue of the locking bushing 82, the sliding collar arrangement 72, the sleeve 92 and the threaded lunette shaft 97; the fifth wheel can be raised only when the tongue is extended and must be lowered before the tongue is retracted.

When the dolly is not in use, a jack 27 shown in FIG. 1 can be extended downwardly to support the two-wheeled dolly by means of the shaft 28 coupled to the screw type jack 27. Shaft 28 has a rearwardly extending portion with a crank handle 29 (FIG. 3) to facilitate its use. When the dolly is in use, the jack 27 will be retracted and out of the way.

It is noted that when the fifth wheel is in the lowered position (i.e., adapted to be coupled to the tractor) a pair of ramps 25 and 26 (FIGS. 1 and 2) prevent the trailer king pin from jamming into the dolly fifth wheel. The ramps are contacted by a striker plate on the front of a trailer to be hitched to the tractor's fifth wheel such that the king pin on the trailer will be lifted above and over the fifth wheel 52 on the dolly and allowed to latch into the fifth wheel associated with the tractor.

This coupling arrangement is shown in FIG. 2 where the rear wheel 100 of a tractor is shown and the fifth wheel 102 of the tractor is positioned to receive the king pin which has been lifted upwardly by the ramp 25 and 26, such that the king pin (trailer and king pin not shown in the figure) will engage the locking mechanism of the fifth wheel 102.

When the dolly is used to pull an additional trailer i.e., when the fifth wheel 52 of the dolly is in the raised position; it will extend above the ramps 25 and 26 as shown in FIG. 4, so that the ramps 25 and 26 will not interfere with the engaging of the king pin associated with the trailer 88 and the trailer can be securely locked to the fifth wheel 52. Having described the operation of the fifth wheel assembly a description of the extendible and retractable tongue mechanism follows.

Figure 6:
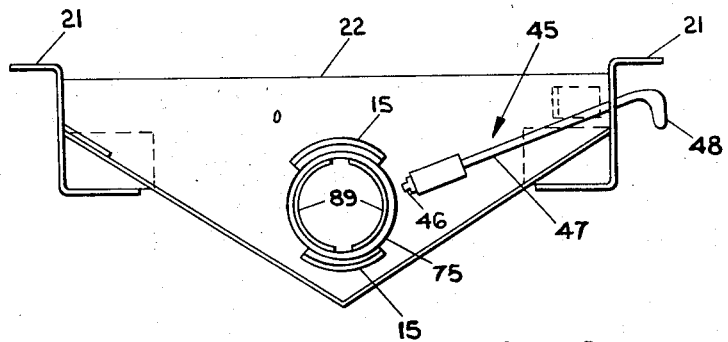
FIG. 6 is a front view of the dolly frame with the tongue shaft and locking collar removed.
Figure 14:
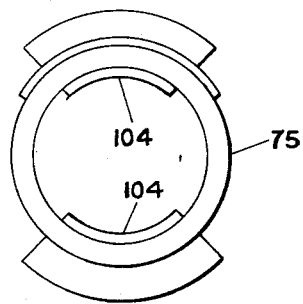
FIG. 14 is a sectional view of the tongue sleeve taken along the section lines XIV—XIV in FIG. 4.

The tongue assembly 70 comprises the tongue shaft 90 which is a hollow cylindrical structure adapted to fit within the tongue sleeve 75 and includes a pair of arcuately shaped segments 94 mounted toward the rear of the shaft 90 and on the outward surface thereof. The tongue includes a lunette 96 mounted to the end of the tongue by means of a threaded shaft 97 which screws into a sleeve 98 welded inside the shaft 90 and pinned to 90 by pin 91. A pair of relatively narrow segments 99 are mounted on either side of the tongue near the end of the shaft 90 adjacent the lunette as shown in dotted lines in FIG. 3. When the tongue is in its retracted position, tongue shaft 90 is in the position shown in FIG. 1 and held in the retracted position by the engagement of the segments 99 on the front edge of the shaft 90 with the arcuate segments 89 which are welded on the forward inside edge of the sleeve 75 as shown in FIGS. 4 and 6. To extend the tongue, the lunette 96 is rotated 90° such that the relatively narrow segments 99 are in a vertical position and oriented to pass between the segments 89 (FIG. 6) such that the tongue can be extended by pulling forward on the lunette. With the lunette rotated 90° the segment 94 toward the rear of the tongue and mounted externally thereto, can clear the arcuate segments 104 shown in FIGS. 4 and 14 on the inside of the sleeve 75. Thus the tongue can be brought forward until the segments 94 on the outside of the tongue shaft 90 strike the segments 89 on the inside forward edge of the tongue sleeve 75, thereby preventing the tongue from being pulled from the sleeve 75.

To lock the tongue in its extended position, shaft 90 is rotated back 90° such that the segments 94 on the tongue are held between the arcuate segments 89 and 104 on the inside of the sleeve 75 as shown in FIG. 4. With the tongue locked in its extended position, the fifth wheel can be raised as described above by cranking the threaded shaft 80 by means of the crank handle 84 such that the fifth wheel 52 is in a position to receive the king pin (not shown) on trailer 88 as shown in FIG. 4. It is noted here that the fifth wheel is self-locking i.e., the pitch of the thread on the threaded shaft 80 is sufficiently shallow such that wherever the shaft 80 is positioned the weight of the trailer on the fifth wheel will not change the position of the shaft or the slidable collar 72, and the fifth wheel will remain in position.

To utilize the convertible dolly as a tandem axle, the fifth wheel is first lowered to the position shown in FIGS. 1 and 2. As noted above, the lunette 96 is rotated 90° such that the arcuate segments 94 can clear the arcuate segments 104 on sleeve 75 and the tongue shaft 90 can be pushed rearwardly within the sleeve 75 until the segments 99 on the front portion of the tongue 90 contact the segments 104. When this occurs, the lunette 96 is rotated back to its horizontal position as shown in FIG. 2. In this position the segments 99 will have their forward edges contacting the rear edges of the segments 89 within the sleeve 75 thereby holding the retracted tongue in a locked position. The fifth wheel is first lowered to the position shown in FIGS. 1 and 2. As noted above, with the tongue in this position, movement of the shaft 80 cannot lift the fifth wheel since there is no reaction surface for the locking bushing 82 to press against such that collar 72 will be moved.

Figures 11, 13:
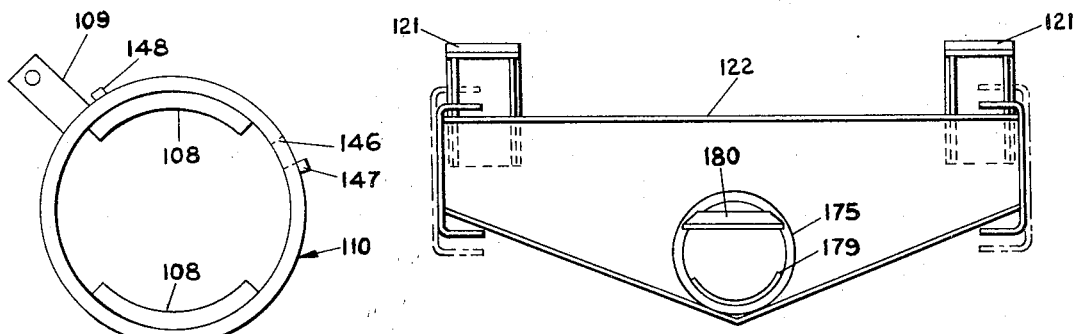
FIG. 11 is a front view of the locking collar showing the arcuate segments which engage with the corresponding segments shown in FIG. 10 when the tractor and dolly are locked together.
FIG. 13 is a front view of the forward frame member of the tractor of the frame assembly shown in FIG. 9.
Figure 9:
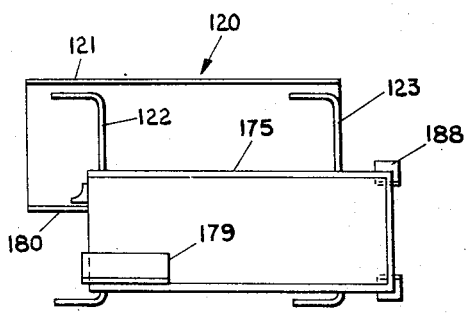
FIG. 9 is a partial cross-sectional side view of the framework on the tractor which is adapted to receive the protruding tongue sleeve of the dolly and to which the locking collar attaches.

The dolly assembly 10 can then be coupled to the tractor framework 120 shown in FIGS. 2, 3 and 9. The tractor frame 120 comprises a pair of fore and aft extending frame members 121 coupled together by front crossarm 122 and a rear crossarm 123. A sleeve 175 is mounted approximately centrally between the fore and aft members 121 and is securely welded to the crossarms 122 and 123. The sleeve is generally cylindrical and has an inner diameter sufficiently large to accommodate the protruding sleeve 75 of the dolly. Thus, in the coupled position shown in FIGS. 2 and 3, the dolly sleeve 75 and lunette 96 on the tongue will extend into and through the sleeve 175 of the tractor frame. As shown in FIGS. 1 and 3, the forward portion of the sleeve 175 includes a wear pad 179 on the lower surface of the sleeve to reduce wear on the sleeve itself caused by movement between sleeves 75 and 175 during motion of the truck. A horizontally oriented plate 180 shown in FIGS. 9 and 13 is welded to the front of the sleeve 175 and prevents the lunette from rotating and thereby possibly unlocking the tongue 90 when the dolly is coupled to the tractor as a tandem axle. It is noted that the upper surface of the sleeve 75 on the dolly also includes a wear pad 79 (FIG. 1) which contacts the upper rear inner surface of the sleeve 175 when the dolly is coupled to the tractor frame.

Figure 8:
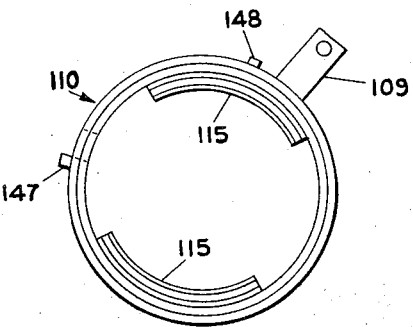
FIG. 8 is a rear view of the locking collar shown in FIG. 7, the collar in FIG. 8 being shown in its locked orientation.
Figure 12:
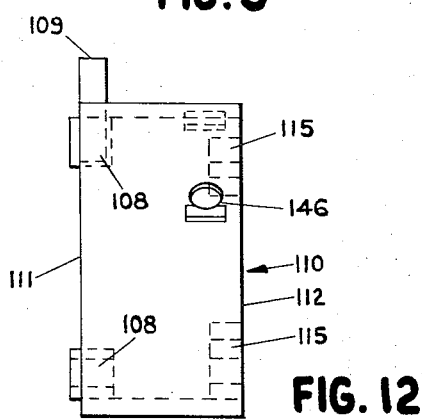
FIG. 12 is a side view of the locking collar.

Once the sleeve 75 of the dolly has been fully inserted into the sleeve 175 of the tractor frame, the dolly is coupled securely to the tractor frame by means of the coupling and locking collar 110 shown in FIGS. 1 through 4 and in detail in FIGS. 8, 11 and 12. FIG. 6 shows the front of the dolly with the tongue shaft 90 and the collar 110 removed to more clearly show the outwardly extending arcuate segments 15 on sleeve 75 and the spring loaded locking pin assembly 45.

The segments 15 are approximately 1/2 of an inch thick and extend around the top and bottom portions of the forwardly extending sleeve 75 of the dolly and are spaced approximately three-fourths of an inch forward of the front surface of frame member 22 as shown in FIG. 2. Mounted adjacent and to the right of the sleeve 75 and welded to the front surface of frame member 22, is the locking pin assembly 45 which includes a spring loaded lock pin 46 mounted to a shaft 47 which extends through an opening in the side frame member 21 and includes a handle portion 48 accessible from the side of the dolly as shown in FIGS. 1, 6 and 7.

Figure 10:
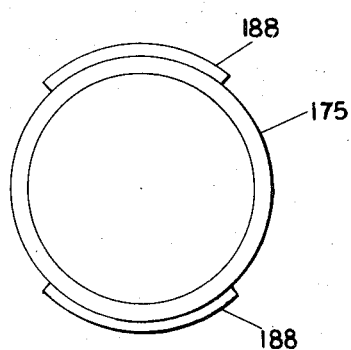
FIG. 10 is a right side view of the arcuate locking segments mounted on the framework shown in FIG. 9.

The locking collar 110 (FIG. 12) has a front surface 111 and a rear surface 112. Surface 112 is mounted adjacent the front frame member 22 of the dolly. As shown in FIGS. 8 and 12, the locking collar 110 includes a pair of arcuate segments 115 located along the inner rear edge of the collar and which are located so that the collar can be placed over the sleeve 75 of the dolly and held in loosely engaged relationship to the dolly by means of the interlocking arcuate segments 15 on the sleeve 75. The rear portion of the sleeve 175 on the tractor frame 120 also includes a pair of arcuate segments 188 as shown in FIG. 10. Segments 188 are adapted to be coupled and engage with the associated arcuate segments 108 near the forward edge of the locking collar 100 as shown in FIGS. 11 and 12. It is seen that with the locking collar rotated in the position shown as position A in FIG. 7, segments 108 and 188 will clear one another. Thus, when the locking collar is rotated to position A by means of a handle 107 coupled to a lug 109 on the locking collar by pulling handle 119 shown in FIGS. 1 and 7, the locking collar 110 is in an unlocked or free position such that the dolly can be coupled or decoupled to and from the tractor frame. The locking collar 110 is retained with the dolly by virtue of the fact that arcuate segments 115 are attached approximately 15° rotationally in relation to front segment 108 thus when segment 108 is aligned for coupling or decoupling the arcuate segment 115 is still locked behind arcuate segment 15 on dolly sleeve 75 as shown in FIG. 4.

Figure 7:
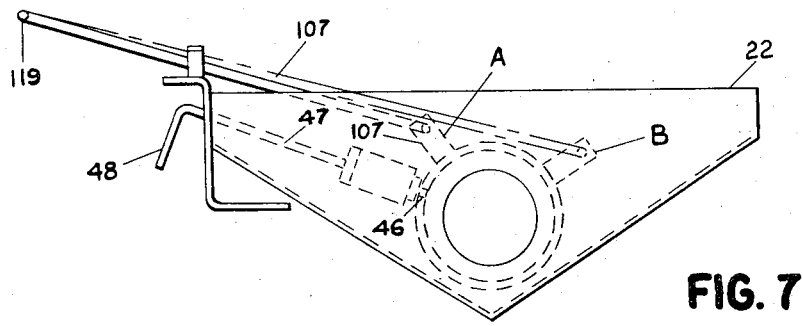
FIG. 7 is a rear view of the same member showing the locking collar coupled to the frame member.

Once the dolly has been placed in position and sleeve 75 on the dolly full engages sleeve 175 of the tractor frame, handle 119 is pushed forwardly such that collar 110 rotates to the position B shown in FIGS. 7, 8 and 11. In this position, the segments 108 on the collar 110 engage the segments 188 on the tractor sleeve 175, and arcuate segments 115 on the collar 110 engage the outwardly protruding arcuate segments 15 on the sleeve 75 of the dolly such that the dolly is held to the tractor frame by means of the locking collar 110. The collar is held and locked into position B by means of the spring loaded lock pin 46 which extends into the aperture 146 in the locking collar 110 and thereby prevents rotation of the collar once in the locked position. A pair of outwardly protruding stops 147 and 148 will limit the rotation of the collar and indicate to the operator that when the stop 148 contacts the released locking pin 46 when handle 48 is retracted, that the locking collar is in the unlocked position and the dolly can be decoupled from the tractor. Likewise, when the handle 119 is pushed forwardly the stop 147 will strike against the locking pin 46 and indicate that the locking collar is in position B. Handle 48 can then be released to allow the pin 46 to engage aperture 146 thereby locking the collar in position. Thus, it is seen that the dolly can be easily coupled to the trailer by means of the quick release type of locking collar which is rotated approximately 90° to either engage the interlocking arcuate segments or to disengage the segments to allow the dolly to be decoupled.

By employing the locking collar with the interengaging arcuate segments, each of which span approximately 90°, a greater contact area between the dolly and the tractor coupler is obtained. This prevents excessive wear which may occur when a locking pin arrangement is employed to hold the two vehicles together. It is noted that the sleeve 75 which fits within sleeve 175 on the tractor is allowed to rotate somewhat to account for uneven road surfaces and will allow the dolly wheels to be elevated over bumps or the like in the road without lifting the drive wheels of the truck (i.e., wheels 100 FIG. 2) off the pavement. When coupled as shown in FIG. 3, the framework 120 of the truck tractor will not contact the front portion of the framework of the dolly, but a small gap exists between the two. It has been found that the sleeve 175 welded to the cross-frame members 122 and 123 provide adequate structural coupling between the dolly and the tractor frame.

Once the dolly is locked to the tractor, air springs 40 are pressurized to a pressure which equalizes the weights on the rear axle of the tractor and the tandem axle 32 of the dolly. Safety chains (not shown) may be employed and would be coupled between the truck frame and the dolly frame. The dolly frame may include a pan for holding the various pneumatic and electrical hoses and cables 25 shown in FIG. 1 when the dolly is not in use. It is noted that these couplings provide air pressure for the brakes and air springs as well as electrical energy for the lights.

Various modifications of the dolly, within the inventive concept set forth, will be apparent to those skilled in the art. The particular embodiment described is merely illustrative and is not intended to limit the scope of the invention as defined in the appended claims.

The embodiments of the invention in which an exclusive property or privilege is claimed are defined as follows.

1. A convertible dolly-tandem axle for use between the rear of a front trailer and the front of a rear trailer or between a truck tractor and a following trailer, comprising: a two-wheeled axle assembly; a frame assembly mounted to said two-wheeled axle assembly; a fifth wheel assembly having a fifth wheel thereon which can be raised and lowered, said fifth wheel assembly coupled to said frame assembly; a tongue sleeve coupled to said frame assembly and including a forward protruding portion; a tongue shaft having a lunette mounted at one end thereof, said shaft telescopically mounted in said tongue sleeve; means for locking said tongue shaft in either an extended position or a retracted position; and a locking collar mounted externally to said tongue sleeve for locking said convertible dolly-tandem axle to said truck tractor when coupled as a tandem axle.

2. An apparatus as defined in claim 1 wherein said tongue sleeve includes exterior arcuate segments mounted on an outside surface thereof approximately adjacent a forward junction of said sleeve with said frame assembly, and wherein said locking collar has internal rear arcuate segments which engage said exterior arcuate segments on said tongue sleeve.

3. The apparatus of claim 2 wherein said locking collar further includes forward internal segments adapted to engage corresponding segments on a truck tractor frame when said apparatus is employed as a tandem axle, and wherein said internal segments of said collar can be disengaged from said corresponding segments by rotating said collar a predetermined angular distance.

4. The apparatus of claim 3 in which said arcuate segments on said sleeve comprise a pair of segments of material which span less than ninety angular degrees and which are positioned opposite one another on said sleeve, and in which said rear and forward segments on said collar comprise pairs of segments of material, each segment of which spans less than ninety angular degrees and each pair of which comprise segments positioned opposite one another.

5. The apparatus of claim 2 and further including means for holding said rotatable locking collar at an angular position on said sleeve in which said internal arcuate segments of said collar engage said arcuate segments of said tongue sleeve and said corresponding segments on said tractor frame.

6. The apparatus of claim 5 and further including means for rotating said collar comprising an outwardly extending tab mounted on said collar, a shaft coupled to said tab at one end thereof and including a handle at the opposite end, and guide means for slidable mounting said shaft to said frame assembly.

7. The apparatus of claim 5 wherein said locking collar includes an aperture therein and said holding means comprise a locking pin mounted to said frame assembly and movable toward and away from an axis of said locking collar and engagable with said aperture in said collar to prevent rotation of said collar when so engaged.

8. The apparatus of claim 7 and further including stops mounted on said locking collar which are mounted at two angular positions on said collar and which contact said locking pin when said pin is not engaged in said aperture in said collar and said collar is rotated between a locked and unlocked position.

9. The apparatus of claim 8 wherein one of said stops is mounted adjacent said aperture in said collar and strikes the release pin when said collar is rotated to a locked position.

10. An apparatus as defined in claim 1 wherein said locking means for locking said tongue shaft comprises arcuate segments on said tongue shaft and extending outwardly therefrom, and associated arcuate segments on an inner surface of said tongue sleeve, said segments and associated segments aligned in a first angular position so as to engage one another thereby preventing movement of said tongue shaft, and aligned in a second angular position to allow said tongue shaft to be freely moved in a longitudinal direction relative to said tongue sleeve.

11. The apparatus of claim 10 in which said fifth wheel is raised and lowered by means of a rotatable threaded shaft mounted concentrically with said tongue shaft, said threaded shaft coupled to said fifth wheel by means of an engaging threaded member, said threaded shaft including a locking bushing at one end and a handle to facilitate rotation at the other end, means at an end of said tongue shaft for engaging said locking bushing only when said tongue shaft is in an extended position.

12. The apparatus of claim 11 in which said engaging means comprises a collar mounted internally to said tongue shaft and having an opening sized to allow said threaded shaft to pass therethrough while preventing said locking bushing from moving therethrough.

13. The apparatus of claim 12 wherein said tongue shaft includes an end closing member at an end remote from said collar to contact said locking bushing of said threaded shaft only when said tongue is in a retracted position.

14. A convertible dolly-tandem axle comprising a framework assembly mounted on a two-wheeled axle, a fifth wheel assembly mounted to said frame assembly, a telescopically adjustable tongue comprising a tongue sleeve and a tongue shaft mounted therein, the combination coupled to said framework assembly; and a locking collar rotatably mounted to said tongue sleeve for coupling said convertible dolly to a truck tractor in tandem axle fashion.

15. The apparatus of claim 14 in which said tongue shaft and sleeve include means for locking said tongue in a retracted position or an extended position.

16. The apparatus of claim 15 wherein said fifth wheel assembly includes raising and lowering mechanism, means for operating said raising and lowering mechanism to raise and lower said fifth wheel only when said telescopic tongue is in a locked extended position.

17. The apparatus of claim 15 in which said tongue includes a lunette for coupling said convertible dolly-tandem axle as a dolly to a trailer when said tongue is in an extended position.

18. The apparatus of claim 14 in which said tongue sleeve extends forwardly of said framework assembly, and said locking collar is mounted to outwardly protruding arcuate segments on said sleeve by means of associated arcuate segments internal said locking collar which engage said outwardly protruding segments when said collar is in a locked rotational position.

19. The apparatus as defined in claim 18 in which said locking collar includes additional arcuate segments adapted to engage corresponding arcuate segments on a tractor frame or said truck when said convertible dolly-tandem axle is coupled to said truck as a tandem axle and said locking collar is in a locked rotational position.

20. The apparatus of claim 19 in which said framework assembly includes a pair of ramps spanning said fifth wheel and extending above said fifth wheel when said wheel is in a lowered position, said ramps tapered downwardly in a rearward direction thereby being adapted to raise a trailer over said fifth wheel when said fifth wheel is lowered to prevent coupling of said trailer to said convertible dolly-tandem axle when said fifth wheel is lowered.

21. The apparatus of claim 19 and further including means for rotating said locking collar and for locking said locking collar in said locked rotational position.

22. A dolly for use with a trailer-truck system, said dolly including a frame and fifth wheel thereon adapted to receive a king pin on said trailer so as to couple said trailer to said dolly, said dolly further comprising:
  a pair of forward arms each having one end pivotally coupled to said frame at a forward portion thereof and each having an other end remote said one end, said other end pivotally coupled to one side of said fifth wheel, said fifth wheel thereby being mounted between said pair of forward arms,
  a collar slidably mounted to said frame so as to be movable in a generally horizontal plane,
  a pair of rear arms each having a first end pivotally coupled to one of said forward arms at a position between said one end and said other end of said forward arms, each of said rear arms having a second end remote said first end which is pivotally coupled to one side of said collar such that said collar is mounted between said rear arms, and
means for slidably moving said collar such that as said collar is moved in a first direction, said fifth wheel is raised, and as said collar is moved in a second direction, said fifth wheel is lowered.

* * * * *